United States Patent
Nunnery

(10) Patent No.: US 8,973,758 B2
(45) Date of Patent: Mar. 10, 2015

(54) METAL BASKET FITTING INSIDE KAMADO GRILLS FOR REMOVING CHARCOAL

(71) Applicant: John Norman Nunnery, Columbus, GA (US)

(72) Inventor: John Norman Nunnery, Columbus, GA (US)

( * ) Notice: Subject to any disclaimer, the term of this patent is extended or adjusted under 35 U.S.C. 154(b) by 130 days.

(21) Appl. No.: 13/874,396

(22) Filed: Apr. 30, 2013

(65) Prior Publication Data
US 2014/0319027 A1 Oct. 30, 2014

(51) Int. Cl.
*B07B 1/00* (2006.01)
*A47J 37/07* (2006.01)

(52) U.S. Cl.
CPC .................................. *A47J 37/0786* (2013.01)
USPC ........... 209/235; 209/233; 209/400; 209/377; 126/25 B; 126/25 R; 126/242; 126/554; 126/244; 110/165 R; 110/167

(58) Field of Classification Search
USPC ........ 126/25 R, 29, 26, 25 B, 25 C, 9 A, 9 B, 126/9 R, 542, 554, 242, 244, 155–158; 209/235, 233, 400, 401, 377; 110/165 A, 165 R, 166, 167
See application file for complete search history.

(56) References Cited

U.S. PATENT DOCUMENTS

| | | | | | |
|---|---|---|---|---|---|
| 3,316,892 | A | * | 5/1967 | Hanke | 126/25 R |
| 3,318,300 | A | * | 5/1967 | Witty | 126/25 C |
| 3,598,102 | A | * | 8/1971 | Fuss | 126/25 R |
| 3,696,800 | A | * | 10/1972 | Close, Jr. | 126/25 A |
| 3,841,299 | A | * | 10/1974 | Tomita | 126/25 B |
| 4,777,927 | A | * | 10/1988 | Stephen et al. | 126/25 R |
| 5,331,942 | A | * | 7/1994 | McDonald et al. | 126/25 R |
| 2009/0308373 | A1 | * | 12/2009 | Scott et al. | 126/25 R |
| 2011/0283990 | A1 | * | 11/2011 | Walters et al. | 126/25 R |
| 2014/0130788 | A1 | * | 5/2014 | Contarino, Jr. | 126/25 R |

* cited by examiner

*Primary Examiner* — Ernesto Suarez

(57) ABSTRACT

An ash basket can act as a sieve or strainer, allowing a user to lift out the charcoal from a kamado grill, clean out the ash, and place the ash basket back into the grill for future use. The ash basket retains larger pieces of charcoal that can be reused, while allowing the ash to pass through to a bottom plate of the grill. The bottom plate has openings to permit the ash to fall to an ash collection chamber. Without the ash basket, pieces of charcoal can block the openings in the bottom plate, making ash collection difficult. Moreover, with the openings blocked, proper air flow through the openings. Finally, the ash basket creates and additional air space that covers the entire surface of the interior walls by separating the ash from the wall, improving air flow, which is critical to the kamado grill design.

8 Claims, 4 Drawing Sheets

METAL BASKET FITTING INSIDE KAMADO GRILLS FOR REMOVING CHARCOAL

BACKGROUND OF THE INVENTION

The present invention relates to grilling accessories and, more particularly, to a metal basket that fits inside of kamado grills for removing charcoal.

Kamado Grills claim a legacy going back thousands of years. Typically, these are grills/smokers that are made of ceramic shells, but may also be made from metal or a variety of stone like materials. This gives these charcoal grills excellent insulation, high efficiency, and the ability to hold very high and very low temperatures making them perfect for grilling and smoking.

Kamado grills, however, have limited access to leftover ash through an opening at the bottom. Although specific designs vary, all kamado grills have a bottom plate that is perforated in order to allow ash to drop into a bottom chamber. Ash is required to be forced through these holes into the bottom chamber and then pulled through the opening for disposal. With charcoal remaining in the grill, it is necessary to move the charcoal around so that the ash can fall through the holes, separating the small charcoal and ash from the larger charcoal. This is a lengthy and tedious process.

After multiple grilling/uses, the ash, along with small chunks of charcoal, will clog the holes and collect around the perimeter of the grill, making the grilling and cleaning process more difficult. As a result, it is necessary to remove the larger charcoal from the top of the grill in order to get to the ash and small pieces of charcoal that need to be removed. Then, the user needs to either shovel out the charcoal or push it around until the ash falls through the holes. Shoveling out the charcoal does not separate the good (larger) charcoal from the ash and small pieces. This results in wasted charcoal. Pushing around the charcoal in the grill takes a very long time and does not effectively remove the ashes as many of the smaller pieces that clog the holes just get pushed into other holes. Clogged holes result in poor air circulation from the bottom of the grill, which is necessary based upon the design of kamado grills.

As can be seen, there is a need for an apparatus to easily separate ash from the usable charcoal in kamado grills.

SUMMARY OF THE INVENTION

In one aspect of the present invention, a basket for grills comprises an outer wire mesh forming a bottom surface and side walls of the basket; at least two handles disposed on opposite sides of an upper edge of the side walls of the basket, the at least two handles operable to pivot between a position inside the basket and a position outside the basket; and a plurality of feet disposed on the bottom surface of the basket, the plurality of feet raising the outer wire mesh from a bottom plate of a grill during use, wherein the sides of the basket are configured to create an air gap between the outer wire mesh and the grill when the basket is disposed on a bottom plate of a grill and the outer wire mesh has openings sized to allow ash to flow through while retaining charcoal pieces in the basket.

In another aspect of the present invention, a basket for holding charcoal on a bottom plate of a kamado grill comprises an outer wire mesh forming a bottom surface and side walls of the basket; at least two handles disposed on opposite sides of an upper edge of the side walls of the basket, the at least two handles operable to pivot between a position inside the basket and a position outside the basket; and a plurality of feet disposed on the bottom surface of the basket, the plurality of feet raising the outer wire mesh from the bottom plate of a grill during use, wherein the sides of the basket are configured to create an air gap between the outer wire mesh and the grill when the basket is disposed on a bottom plate of a grill; and the outer wire mesh has openings sized to allow ash and small pieces of charcoal to flow through while retaining charcoal pieces in the basket.

In a further aspect of the present invention, a method for using a kamado grill comprises placing a basket on a bottom plate of the grill, the basket including an outer wire mesh forming a bottom surface and side walls of the basket, at least two handles disposed on opposite sides of an upper edge of the side walls of the basket, the at least two handles operable to pivot between a position inside the basket and a position outside the basket, and a plurality of feet disposed on the bottom surface of the basket, the plurality of feet raising the outer wire mesh from a bottom plate of a grill during use, wherein the sides of the basket are configured to create an air gap between the outer wire mesh and the grill when the basket is disposed on a bottom plate of a grill; disposing charcoal in the basket; using the charcoal to cook on the grill; allowing the charcoal to cool; lifting the handles to raise the basket, allowing the ash in the basket to fall through the outer wire mesh; retaining usable charcoal in the basket; removing the ash from the grill; and replacing the basket with usable charcoal for a subsequent use.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an ash basket that can act as a sieve or strainer, allowing a user to lift out the charcoal from a kamado grill, clean out the ash, and place the ash basket back into the grill for future use. The ash basket retains larger pieces of charcoal that can be reused, while allowing the ash and smaller particles to pass through to a bottom plate of the grill. The bottom plate has openings to permit the ash to fall to an ash collection chamber. Without the ash basket, pieces of charcoal can become wedged in the holes and block the openings in the bottom plate, making ash collection difficult. Moreover, with the openings blocked, proper air flow through the openings. Finally, the ash basket creates and additional air space that covers the entire surface of the interior walls by separating the ash from the wall, improving air flow, which is critical to the kamado grill design. Additionally, the grill basket can be used to remove not only charcoal but also other flavoring wood or wood chips so that the subsequent use of the grill doesn't also get the flavor from the left over wood chips or chunks.

Figure 4:
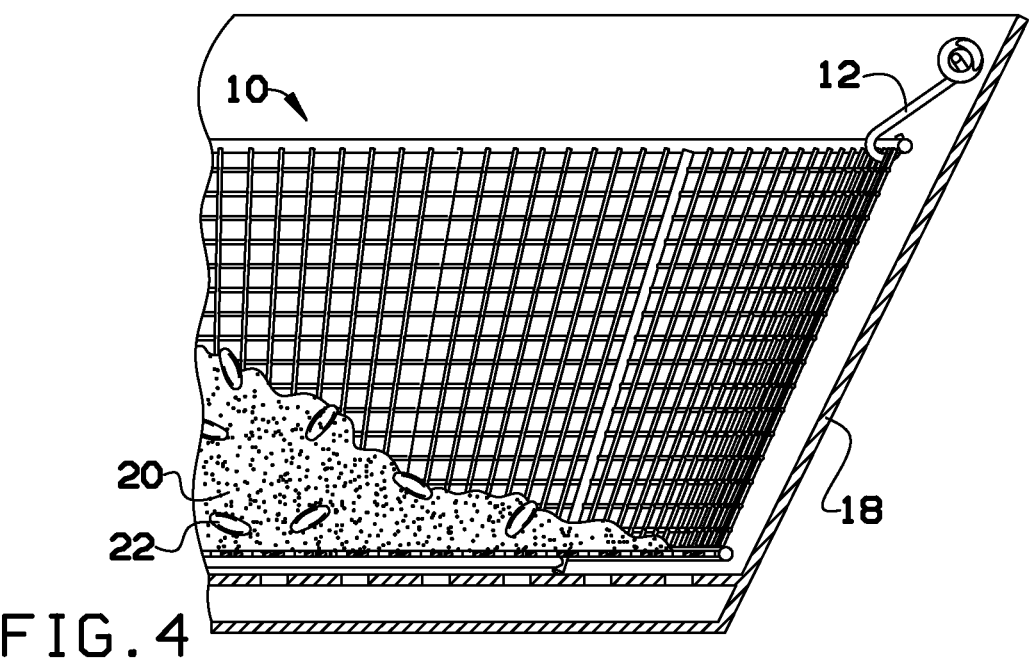
FIG. 4 is a partially cut-away sectional view of the grill basket of FIG. 1, illustrating use thereof prior to removal from a kamado grill.

Referring now to FIGS. 1 through 5, a basket 10 can be made of a metal mesh 16 with at least two handles 12 disposed on opposite sides of the basket 10. The handles 12 can pivot about an upper edge of the basket 10, allowing the handles to be turned upward (as shown in FIG. 4) or even fold into the basket 10 during use thereof. The wire metal mesh 16 can be designed of a heat-resistant metal so that continued use to hold hot charcoal does not degrade the wire metal mesh.

Figure 1:
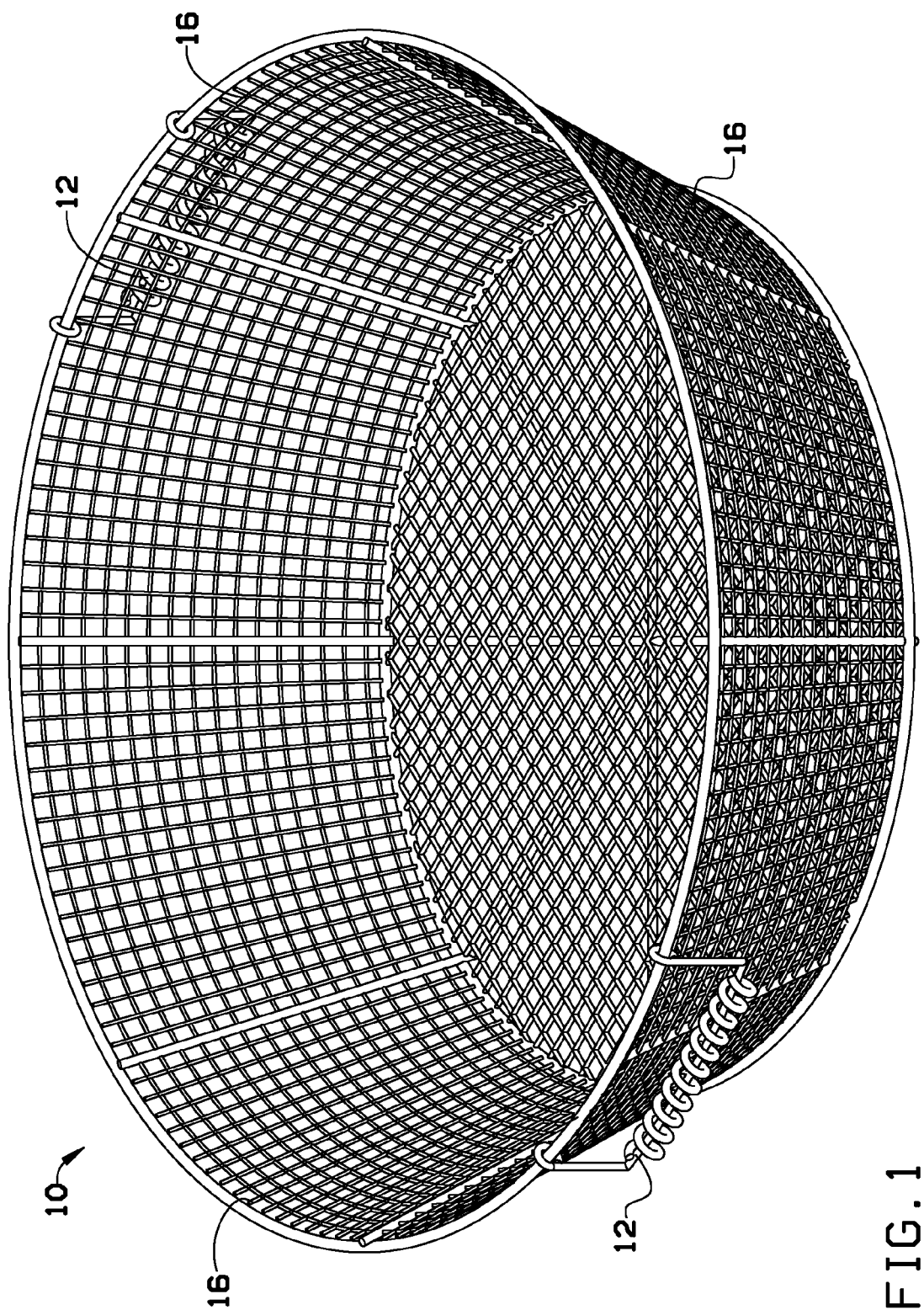
FIG. 1 is a perspective view of a grill basket according to an exemplary embodiment of the present invention.
Figure 2:
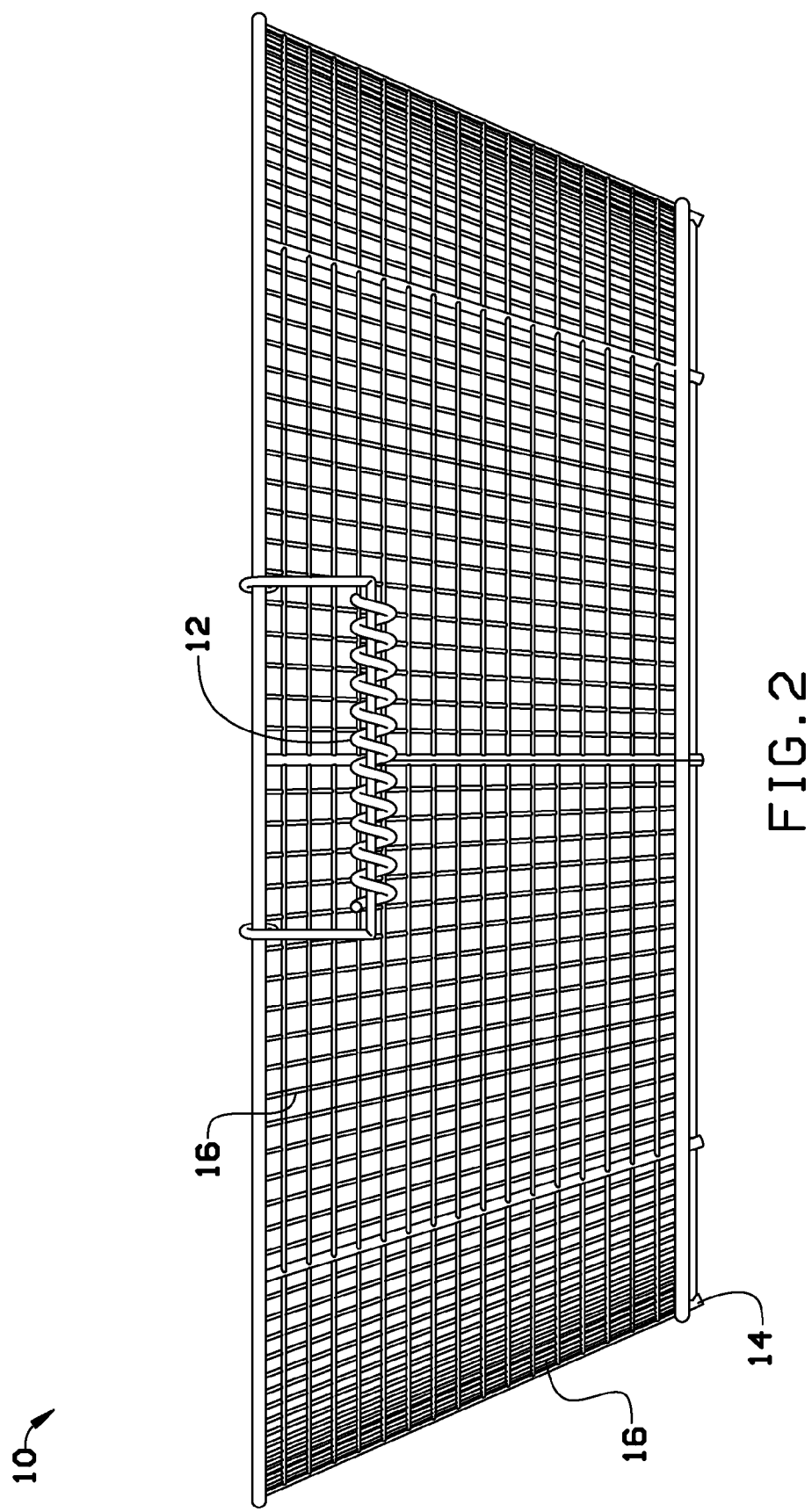
FIG. 2 is a side view of the grill basket of FIG. 1.
Figure 6:
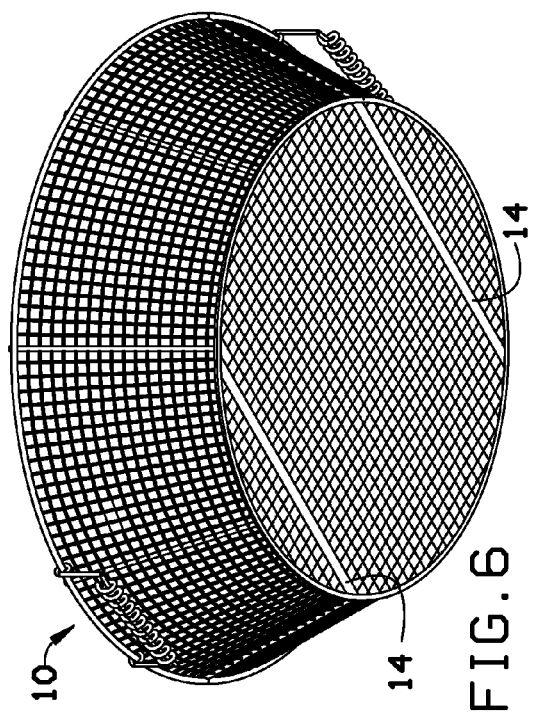
FIG. 6 is a bottom perspective view of the grill basket of FIG. 1.
Figure 3:
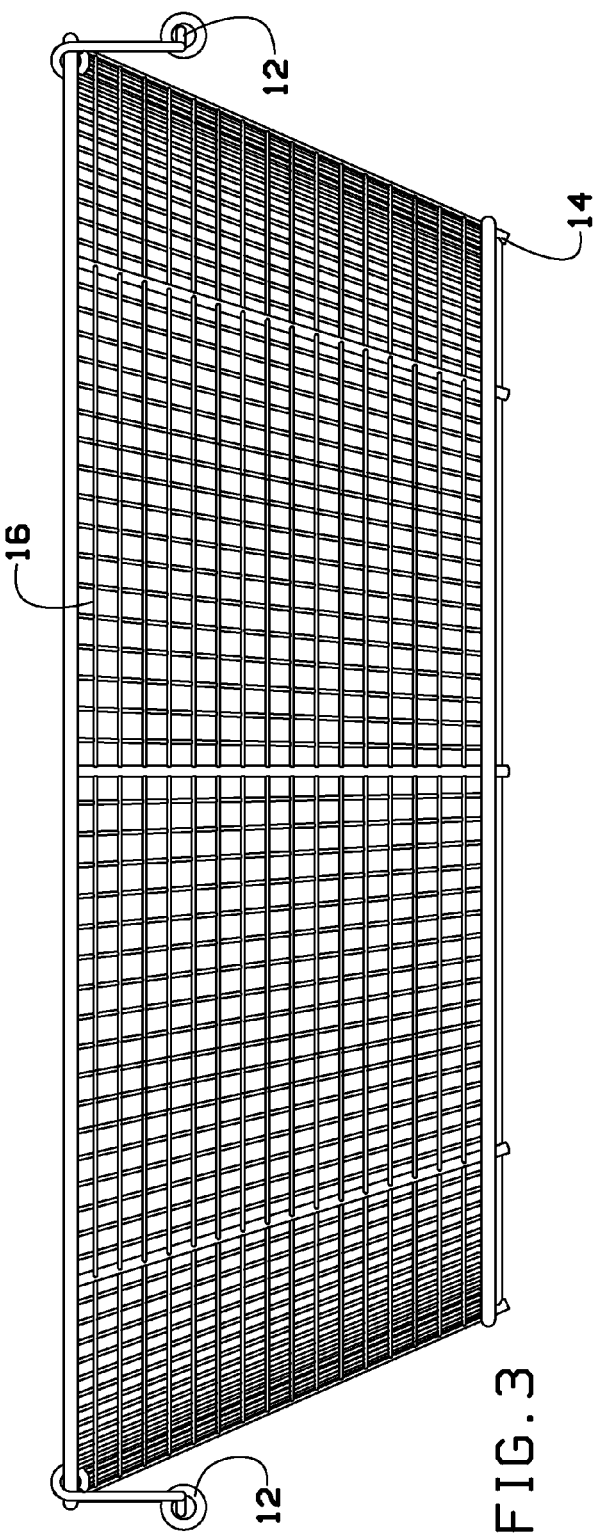
FIG. 3 is a front view of the grill basket of FIG. 1.

A plurality of feet 14 can be disposed on the bottom of the basket. The feet 14 can have a height from about ¼ inch to about 1 inch or taller. The feet 14 are designed to raise the basket above the bottom plate 24 of a kamado grill 18. In some embodiments, the feet 14 can be made from bent support bars disposed on the bottom of the basket 10. In other embodiments, the feet 14 can sweep the bottom plate of the kamado grill when the basket 10 is rotated. In this embodiment, the feet 14 can traverse the entire bottom of the basket, as shown in FIG. 6. For larger baskets, additional feet 14 can be disposed across the bottom of the basket. Of course, depending on the size and configuration of the basket 10 the feet 14 can be designed from separate metal elements attached to the bottom of the basket 10.

The basket 10 can be sized and shaped slightly smaller than the interior of the grill 18. The basket 10 can be installed inside the grill 18, below the cooking surface (not shown) and below the heat deflector (not shown). Because the basket 10 is slightly smaller than the interior of the grill, an air space 28 is created between the basket 10 and the grill 18, separating the ash 20 from the grill 18 to improve air flow.

Figure 5:
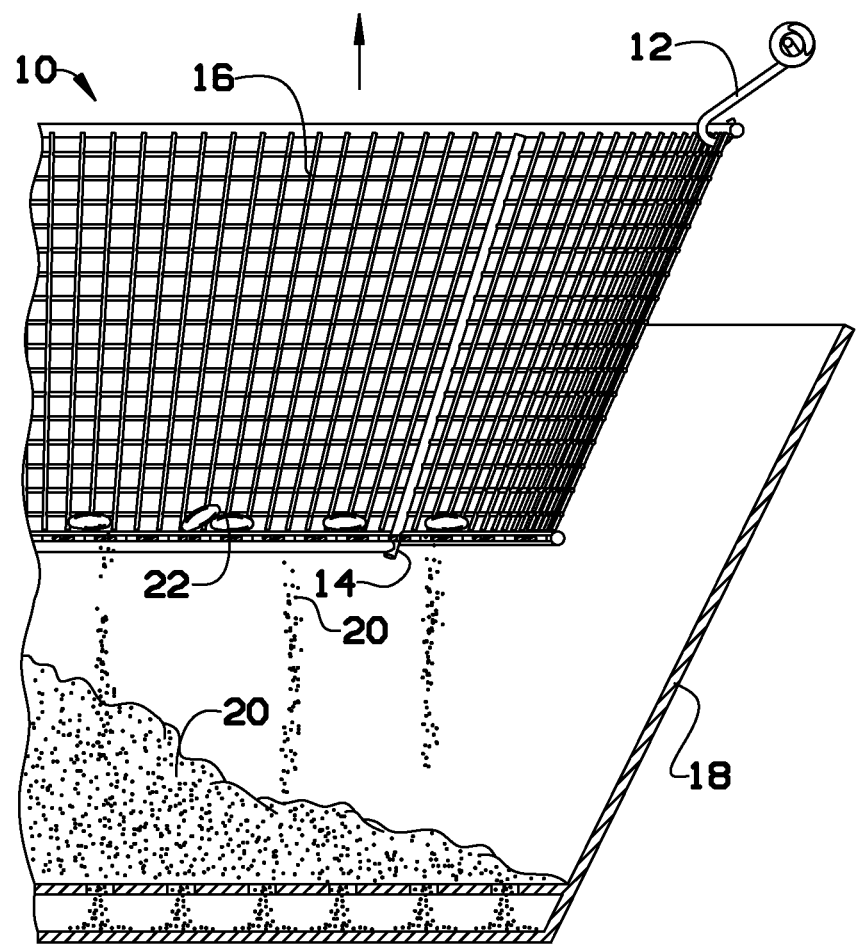
FIG. 5 is a partially cut-away sectional view of the grill basket of FIG. 1, illustrating use thereof after removal from the kamado grill.

To use the basket 10 of the present invention, a user can begin with a clean (without charcoal) grill. The basket 10 can be installed inside the grill, below the cooking surface and below the heat deflector. The handles can be folded inward to allow the basket to fit under the cooking surface. The basket can be filled with charcoal, just as the grill would normally be used if the basket were not in place. Prior to the next use and after the charcoal has cooled, the basket can be lifted slightly, agitated to remove small particles and ash 20 (as shown in FIG. 5), and then removed from the grill. Typically, in using the grill basket of the present invention, a user can lift the basket, agitate it and then return it to the grill and add more charcoal for the next use. Use of the grill basket can practically eliminate the need for cleaning the grill from the top of the plate and only requires scraping out ash 20 from the very bottom of the grill. The remaining particles of charcoal 22, in the basket 10, can be reused for the next grill use. The grill basket can be used to remove not only charcoal but also other flavoring wood or wood chips so that the subsequent use of the grill doesn't also get the flavor from the left over wood chips or chunks. In other words, after smoking a pork shoulder, a user can easily get the hickory completely out of the grill so that if the user does salmon next, they do not get hickory smoke.

While the above describes the basket for use in a kamado grill, the basket could be used in other environments, such as without a grill in a camping setting, for example.

It should be understood, of course, that the foregoing relates to exemplary embodiments of the invention and that modifications may be made without departing from the spirit and scope of the invention as set forth in the following claims.

What is claimed is:

1. A basket for grills, comprising:
   an outer wire mesh forming a bottom surface and side walls of the basket;
   at least two handles disposed on opposite sides of an upper edge of the side walls of the basket, the at least two handles operable to pivot between a position inside the basket and a position outside the basket; and
   a plurality of feet disposed on the bottom surface of the basket, the plurality of feet raising the outer wire mesh from a bottom plate of a grill during use, wherein
   the sides of the basket are configured to create an air gap between the outer wire mesh and the grill when the basket is disposed on a bottom plate of a grill.

2. The basket of claim 1, wherein the grill is a kamado grill.

3. The basket of claim 1, wherein the outer wire mesh has openings sized to allow ash to flow through while retaining charcoal pieces in the basket.

4. A basket for holding charcoal on a bottom plate of a kamado grill, comprising:
   an outer wire mesh forming a bottom surface and side walls of the basket;
   at least two handles disposed on opposite sides of an upper edge of the side walls of the basket, the at least two handles operable to pivot between a position inside the basket and a position outside the basket; and
   a plurality of feet disposed on the bottom surface of the basket, the plurality of feet raising the outer wire mesh from the bottom plate of a grill during use, wherein
   the sides of the basket are configured to create an air gap between the outer wire mesh and the grill when the basket is disposed on a bottom plate of a grill; and
   the outer wire mesh has openings sized to allow ash to flow through while retaining charcoal pieces in the basket.

5. A method for using a kamado grill, comprising:
   placing a basket on a bottom plate of the grill, the basket including an outer wire mesh forming a bottom surface and side walls of the basket, at least two handles disposed on opposite sides of an upper edge of the side walls of the basket, the at least two handles operable to pivot between a position inside the basket and a position outside the basket, and a plurality of feet disposed on the bottom surface of the basket, the plurality of feet raising the outer wire mesh from a bottom plate of a grill during use, wherein the sides of the basket are configured to create an air gap between the outer wire mesh and the grill when the basket is disposed on a bottom plate of a grill;
   disposing charcoal in the basket;
   using the charcoal to cook on the grill;
   allowing the charcoal to cool;
   lifting the handles to raise the basket, allowing the ash in the basket to fall through the outer wire mesh;
   retaining usable charcoal in the basket;
   removing the ash from the grill; and
   replacing the basket with usable charcoal for a subsequent use.

6. The method of claim 5, further comprising agitating the basket once lifted from the bottom plate of the grill to help remove ash from the basket.

7. The method of claim 5, further comprising retaining charcoal in the basket that would clog holes in the bottom plate.

8. The method of claim 5, further comprising allowing air to pass in the air gap during use of the grill.

* * * * *